United States Patent [19]

Song

[11] Patent Number: 4,833,551
[45] Date of Patent: May 23, 1989

[54] DUAL HEAD SERVO SYSTEM AND METHOD FOR A MAGNETIC DISK

[75] Inventor: Hubert Song, Sunnyvale, Calif.

[73] Assignee: Konishiroku Photo Industries Co., Ltd., Tokyo, Japan

[21] Appl. No.: 17,571

[22] Filed: Feb. 24, 1987

[51] Int. Cl.$^4$ .............................................. G11B 5/596
[52] U.S. Cl. ............................... 360/77.05; 360/77.08
[58] Field of Search ................ 360/75, 77, 78, 97–99, 360/135

[56] References Cited

U.S. PATENT DOCUMENTS

| | | | |
|---|---|---|---|
| 4,380,034 | 4/1983 | Krake | 360/77 |
| 4,424,543 | 1/1984 | Lewis et al. | 360/77 |
| 4,638,384 | 1/1987 | Stewart et al. | 360/77 |

FOREIGN PATENT DOCUMENTS

| | | | |
|---|---|---|---|
| 53-83717 | 7/1978 | Japan | 360/77 |
| 53-76813 | 7/1978 | Japan | 360/78 |
| 54-158206 | 12/1979 | Japan | 360/77 |
| 55-150161 | 11/1980 | Japan | 360/77 |
| 56-29872 | 3/1981 | Japan | 360/77 |
| 60-193176 | 10/1985 | Japan | 360/77 |

Primary Examiner—Alan Faber
Assistant Examiner—Steven R. Garland
Attorney, Agent, or Firm—Thomas E. Schatzel

[57] ABSTRACT

A servo system for a removable disk having twice the servo information per disk track. The disk is encoded such that the servo sectors on one surface of the disk are angularly off-set and are located half-way between the servo sectors on the other side of the disk. Once a desired track is located, the disk rotates and the system switches between heads on the two surfaces of the disk to alternately read the servo sectors on both sides of the disk. A demodulator, peak detector, sample/hold device stores the servo information from the previous two servo sectors which were read to produce a position error signal which controls the linear motor to keep the heads on the desired track.

5 Claims, 14 Drawing Sheets

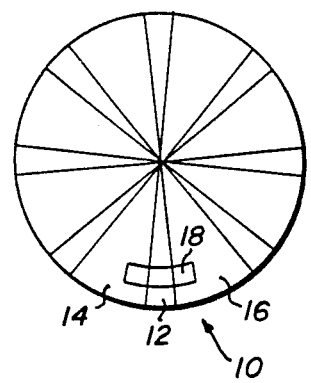
Fig_1
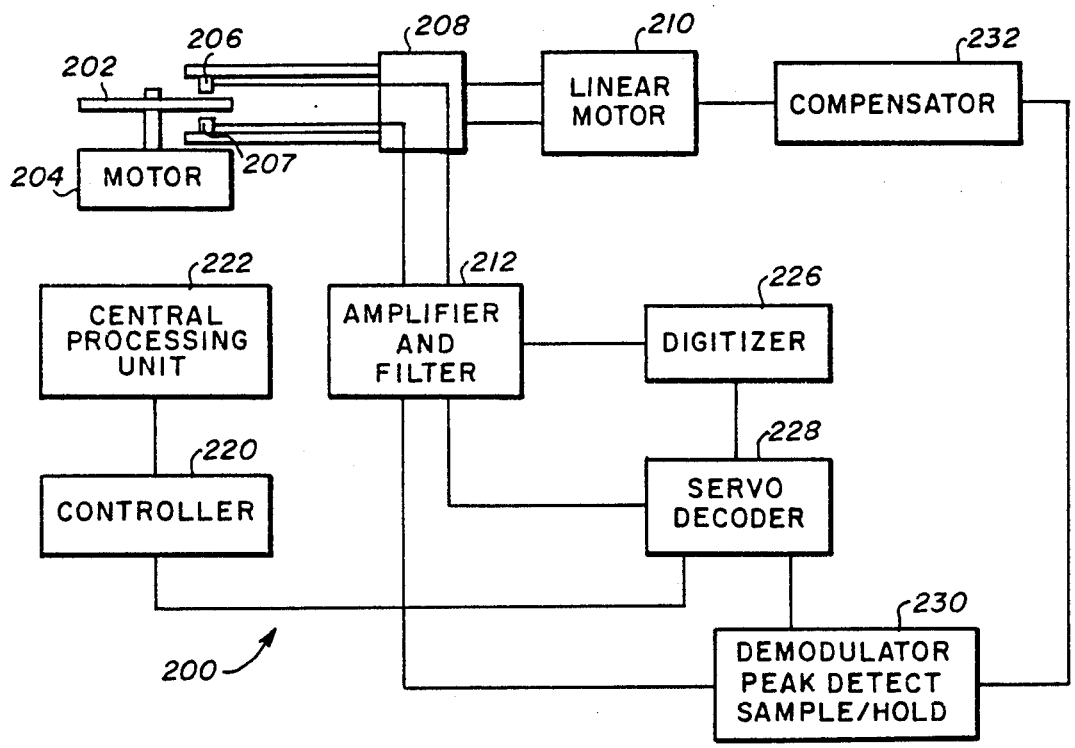
Fig_3

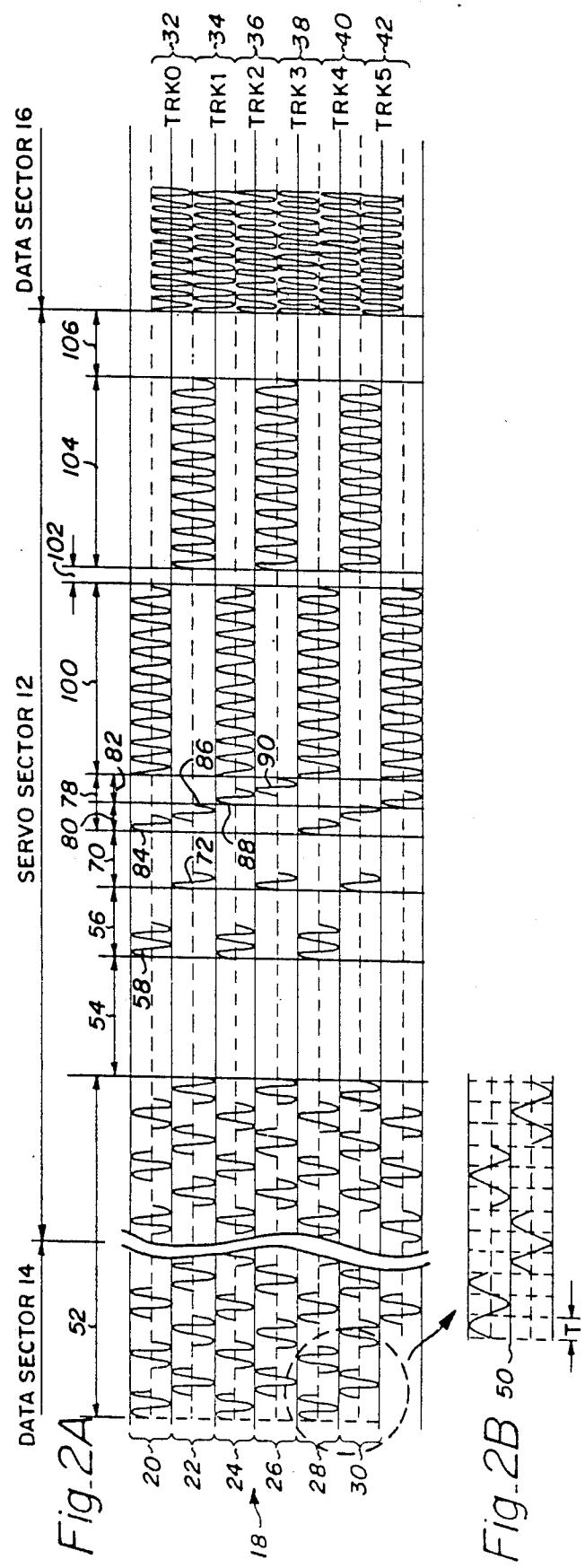

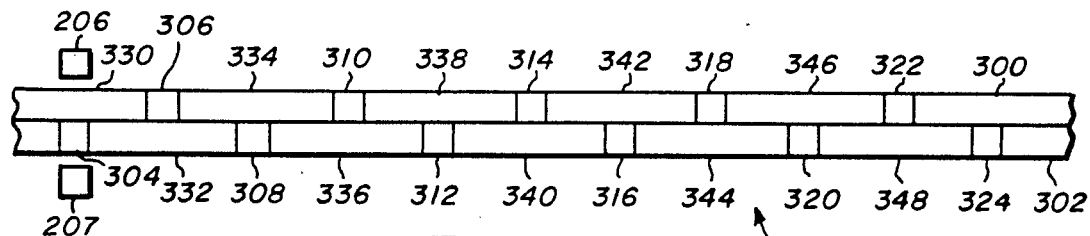
Fig_4
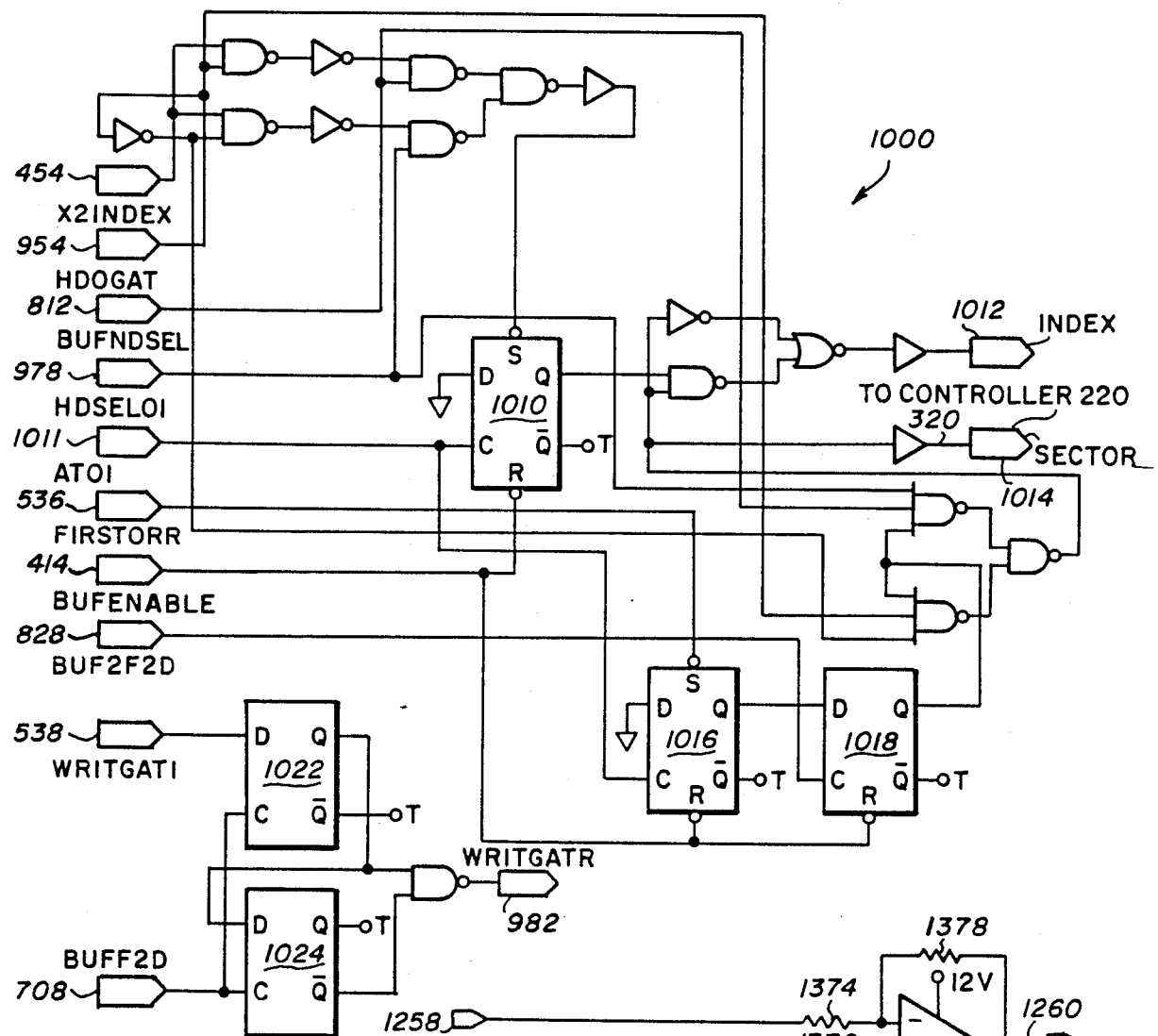
Fig_10
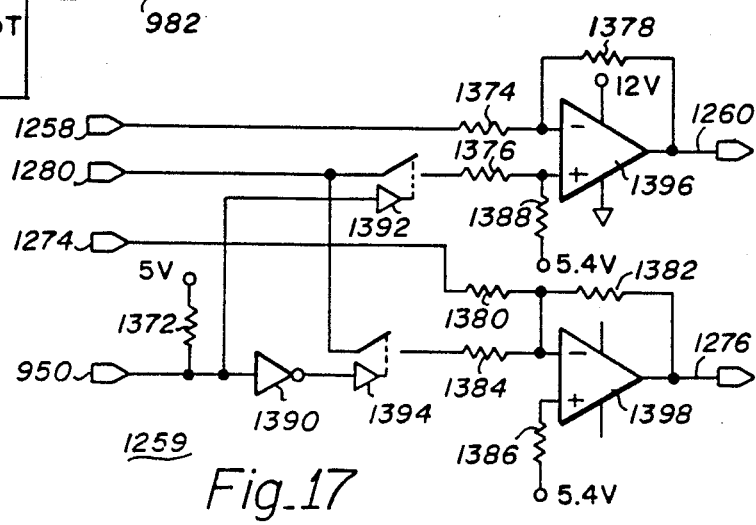
Fig_17

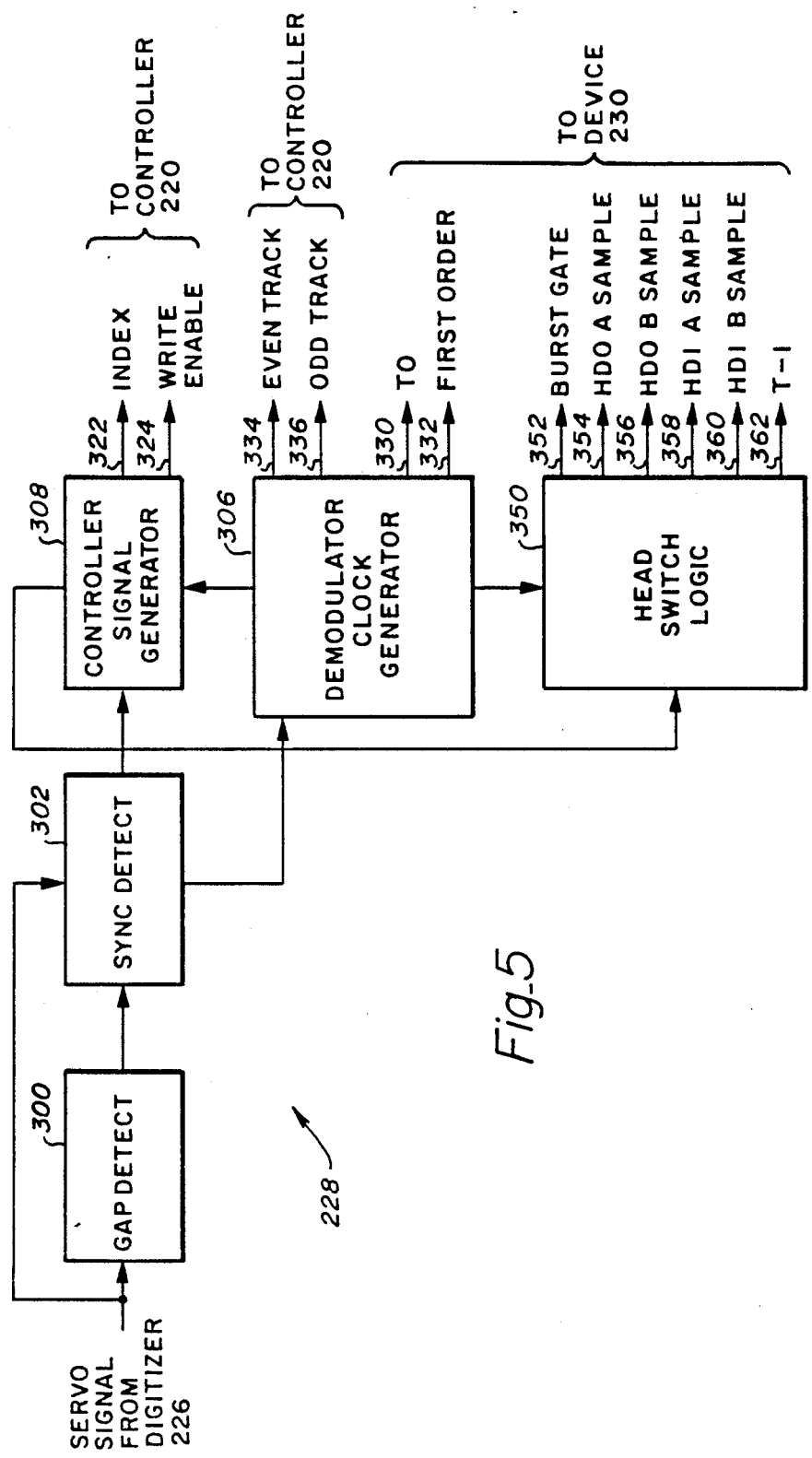
Fig_5

Fig_7

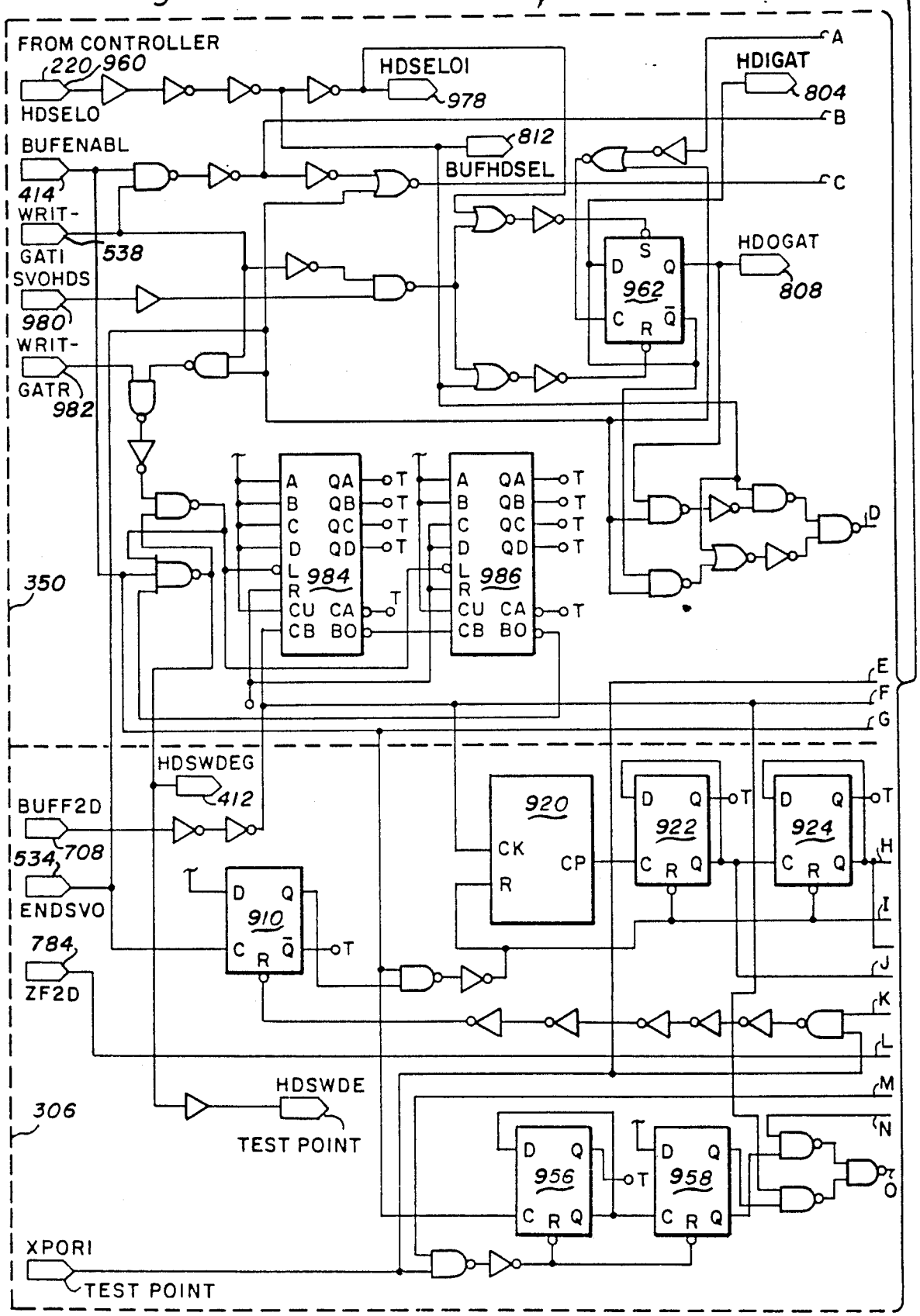
Fig_9A

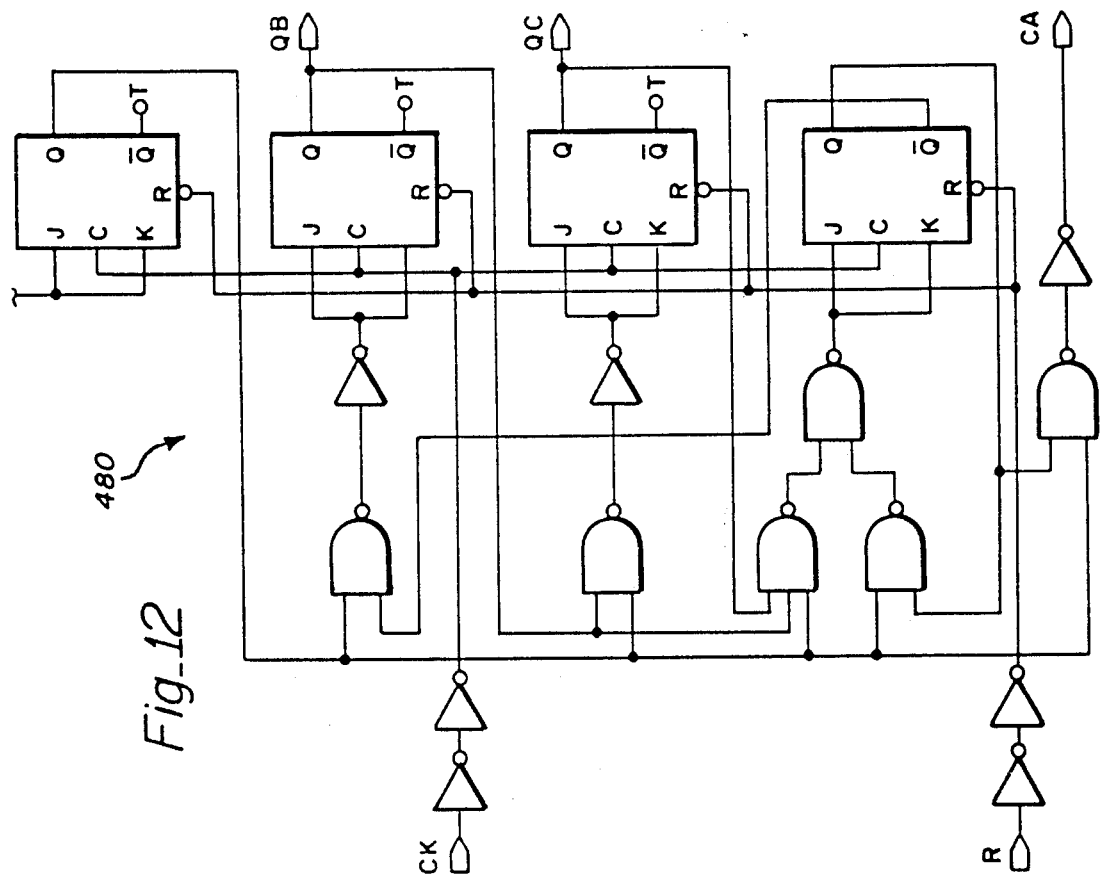
Fig_12
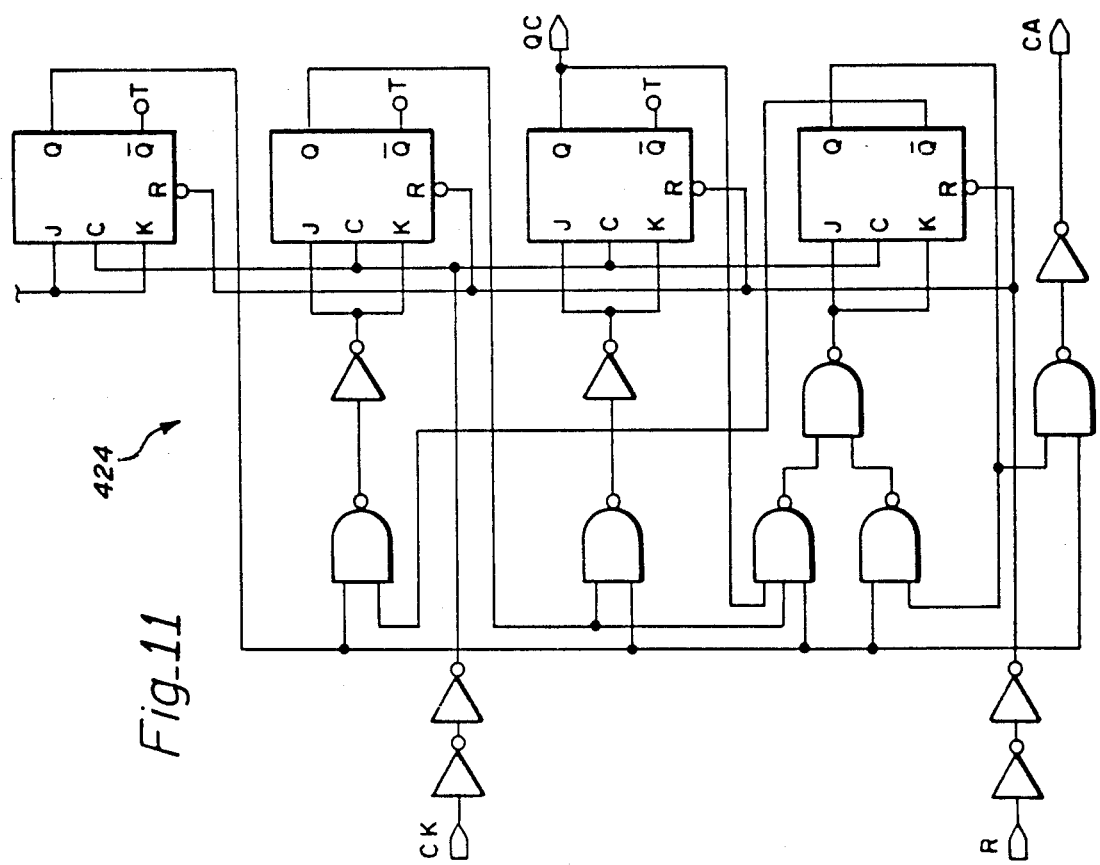
Fig_11

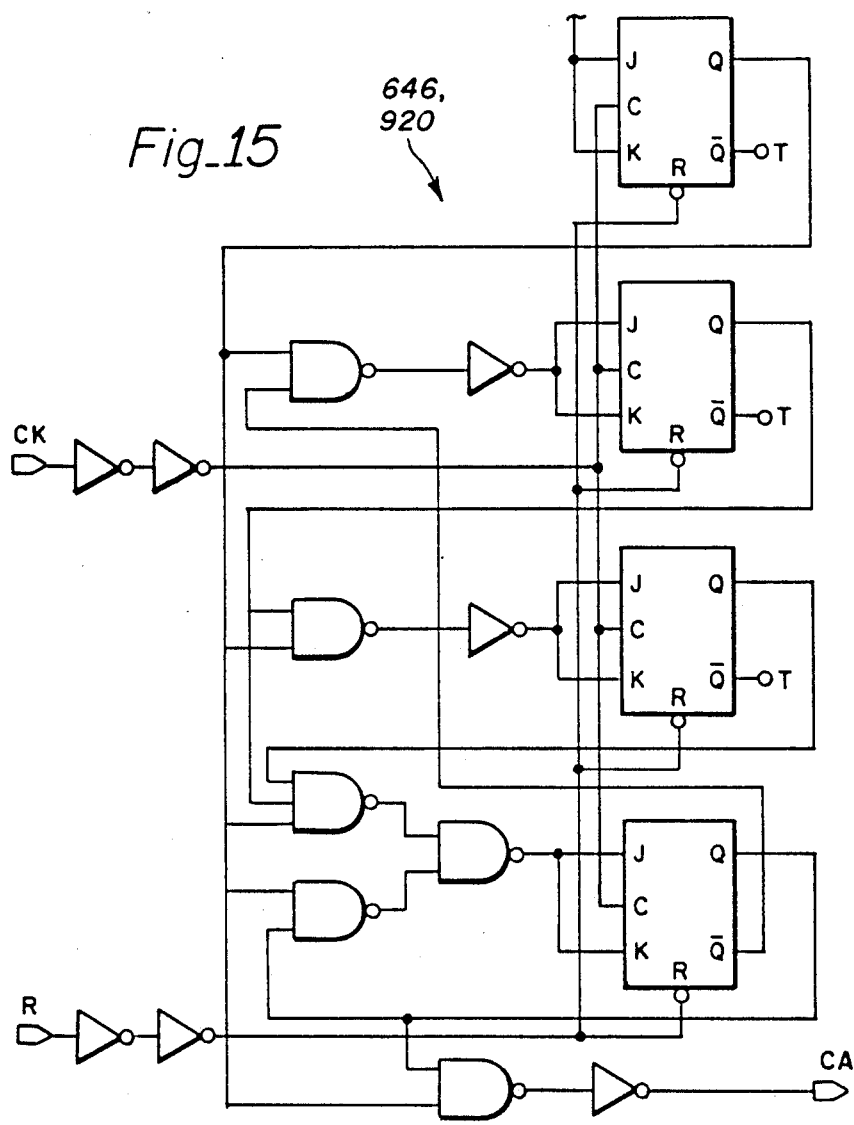
Fig_15

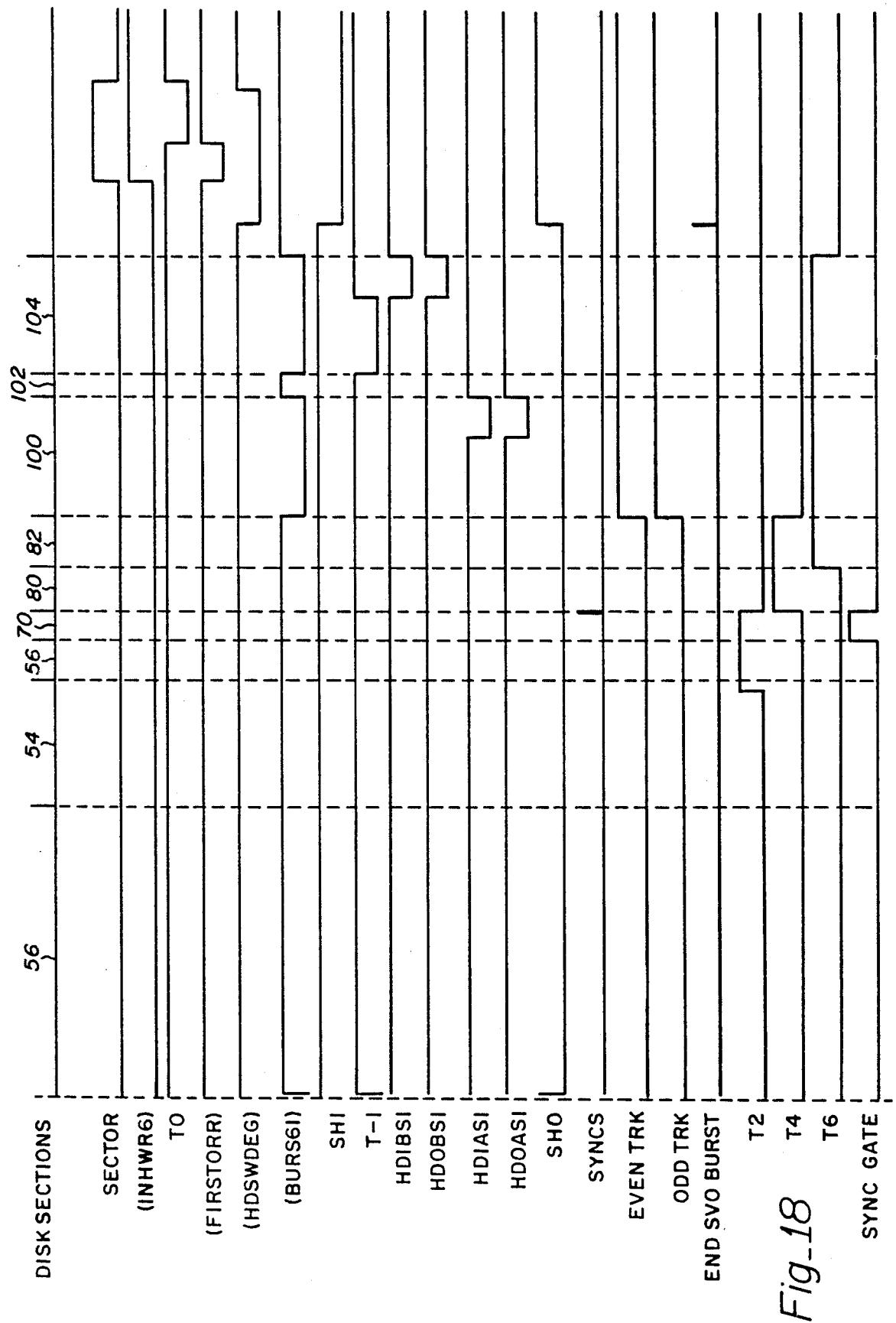
Fig_18

DUAL HEAD SERVO SYSTEM AND METHOD FOR A MAGNETIC DISK

BACKGROUND OF THE INVENTION

1. Field of the Invention

This invention relates generally to data disk drive systems and more particularly to servo systems for keeping the transducer head on track.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write or transducer head. The binary information is encoded on the face of the disk in concentric rings, called tracks, and the read/write head can move radially along the disk face to select a particular track to record or retrieve information. The data disks can be rigid or flexible.

The removable rigid disks typically have track densities of about five hundred tracks per inch of radius of the disk. The flexible disks typically have densities of forty-eight or ninety-six tracks per inch. Because of the high density, precise positioning of the read/write head is necessary so that the head can accurately gain access to a particular desired track on the surface of the disk and follow the track as the disk rotates.

In order to obtain precise positioning when seeking a desired track, the disk drives sometimes have a glass scale which provides the disk drive with coarse information on the position of the read/write head. Once the head reaches a desired track, a method is needed to keep the head on track as the disk rotates. One such method for flexible disks involves the use of servo sectors and is disclosed by a co-pending application for "Servo Synchronization Method and Apparatus for a Magnetic Disk", Ser. No. 06/918,502, filed on Oct. 14, 1986, by the same inventor which is assigned to the same assignee as in the present application. The servo sector tracks contain positioning data to help the transducer heads stay on the data track. The servo tracks are radially off-set from the data tracks such that a transducer head passes between the servo tracks when it is positioned along a data track.

The consecutive servo tracks alternate between having an "A" burst and a "B" burst. The transducer head reads the "A" and "B" bursts from the servo tracks on either side. The intensities of the "A" and "B" bursts are measured and the head is adjusted to keep the head midway between the servo tracks and directly on the data track.

In order for the data disk to have the maximum data storage capacity, a number of servo sectors should be kept to a minimum. However, if there are not enough servo sectors per revolution, then the heads cannot stay on track.

SUMMARY OF THE INVENTION

It is an object of the present invention to provide a servo system which minimizes the number of servo sectors.

It is another object of the present invention to provide a servo system which uses two heads to obtain servo information from both sides of the disk.

It is another object of the present invention to provide a servo system which estimates the future position of the head based upon the last two servo sector positions read.

Briefly, in a preferred embodiment, the present invention provides a data disk which has two sides. Both sides have servo sectors alternating with data sectors. The servo sectors on the first side are angularly off-set from the servo sectors on the second side such that the servo sectors on the first side are located midway between the servo sectors on the bottom side.

When a track on a first side of the disk is written upon or read, the heads on both sides of the disk alternate in reading the servo information on each side of the disk in order to keep the head on the first side of the disk on track. The servo sectors on the first side are off-set from the servo sectors on the other side so that the servo sectors do not duplicate each other. The device is thus able to effectively double the amount of servo sectors without decreasing the area available for data sectors.

A decoder has a head switching circuit which uses the timing information from the servo sectors to switch from reading one head to the other head as the disk rotates. A demodulator, peak detector, and sample/hold device uses the timing information from the decoder to read the servo information and produce a position signal. The position signal is used to control the linear motor to radially position the heads. The demodulator, peak detector and sample/hold device has a first order circuit which uses the position information from the previous two servo sectors to estimate the future position of the transducer head.

It is an advantage of the present invention in that it provides a servo system which minimizes the number of servo sectors.

It is another advantage of the present invention in that it provides a servo system which uses two heads to obtain servo information from both sides of the disk.

It is another advantage of the present invention in that it provides a servo system which estimates the future position of the head based upon the last two servo sector positions.

These and other objects and advantages of the present invention will no doubt become obvious to those of ordinary skill in the art after having read the following detailed description of the preferred embodiment which is illustrated in the various drawing figures.

IN THE DRAWINGS

FIG. 1 is a top view of a magnetic disk sectored according to the present invention;

FIG. 2A is a diagram of recordings of a portion of the disk shown in FIG. 1;

FIG. 2B is a diagram of recordings of a portion of the disk shown in FIG. 2A;

FIG. 3 is a block diagram of a data disk drive system of the present invention;

FIG. 4 is a side elevation view of the disk shown in FIG. 1;

FIG. 5 is a block diagram of the servo decoder of the system shown in FIG. 3;

Figure 9B:
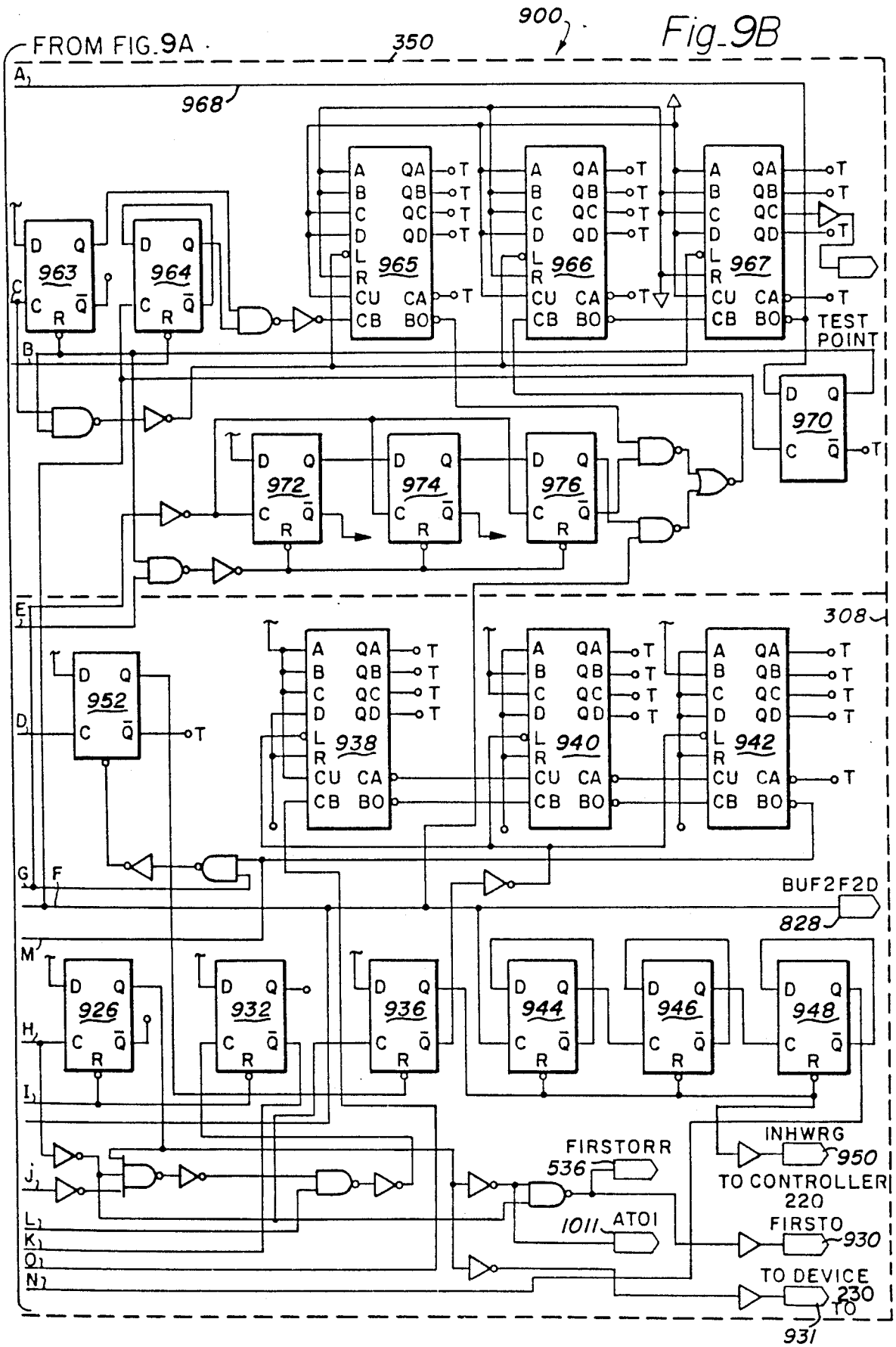
Figures 13, 14:
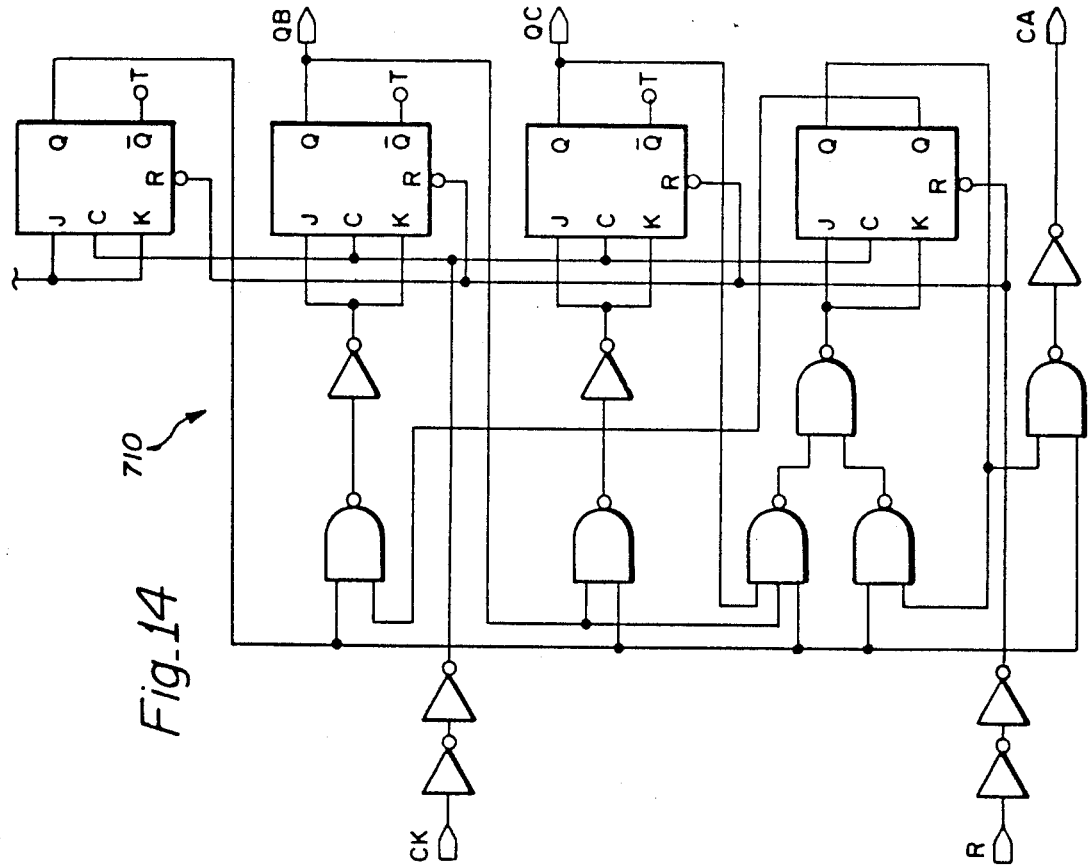
Figure 16:
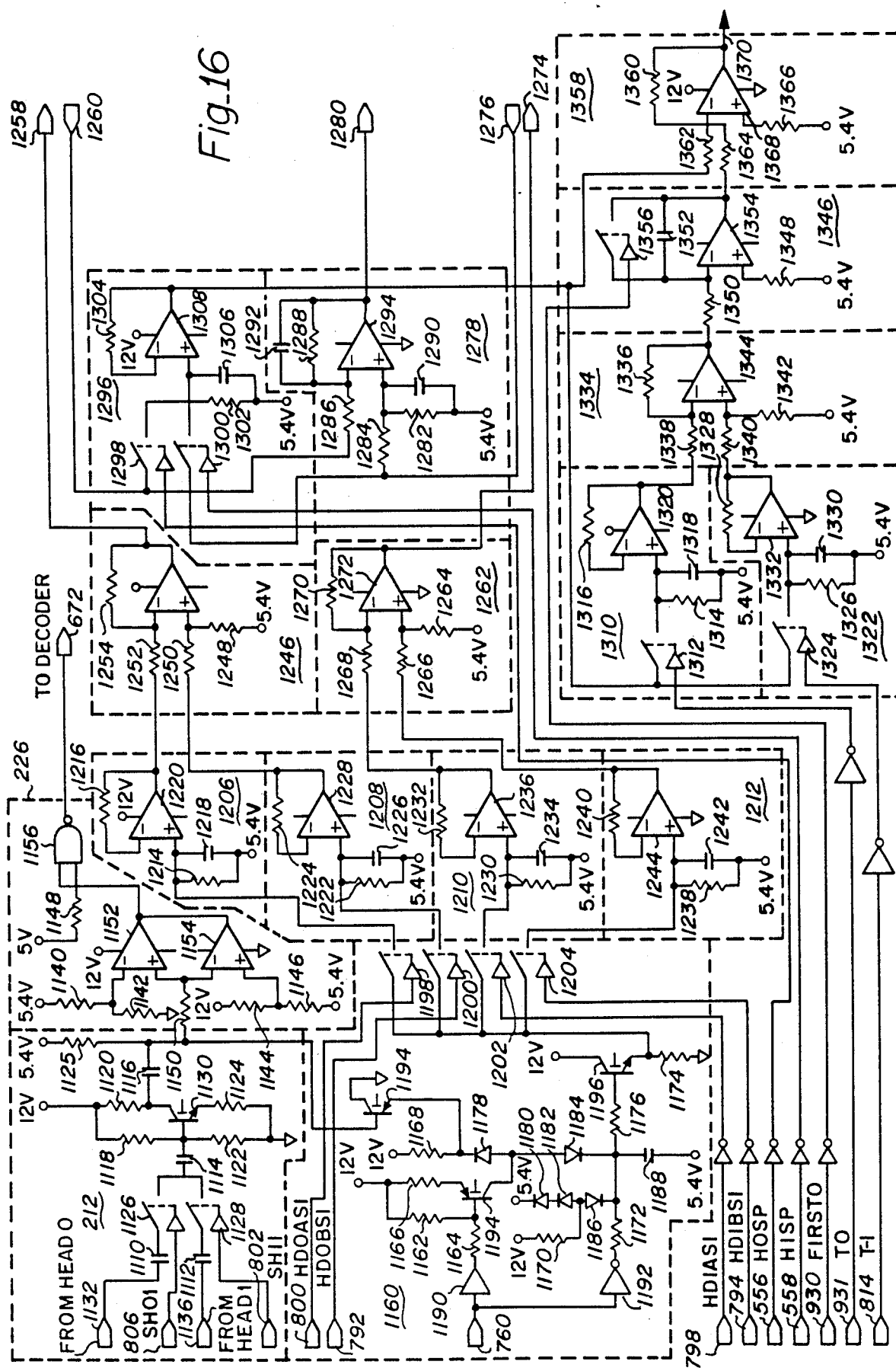

FIGS. 9A and 9B, compositely, are a circuit diagram of part of the servo decoder of FIG. 5;

FIG. 10 is a circuit diagram of part of the servo decoder of FIG. 5;

FIG. 11 is a circuit diagram of part of the servo decoder of FIG. 5;

FIG. 12 is a circuit diagram of part of the servo decoder of FIG. 5;

FIG. 13 is a circuit diagram of part of the servo decoder of FIG. 5;

FIG. 14 is a circuit diagram of part of the servo decoder of FIG. 5;

FIG. 15 is a circuit diagram of part of the servo decoder of FIG. 5;

FIG. 16 is a circuit diagram of the amplifier, filter, digitizer and part of the demodulator, peak detector, sample/hold device of FIG. 3;

FIG. 17 is a circuit diagram of part of the demodulator, peak detector, sample/hold device of FIG. 3; and FIG. 18 is an illustration of the relationship of the timing signals of the servo decoder of FIG. 3.

DETAILED DESCRIPTION OF THE PREFERRED EMBODIMENT

FIG. 1 shows a flexible magnetic disk of the present invention and is designated by the general reference number 10. The disk 10 is divided into data sectors and servo sectors with a servo sector 12 located between a data sector 14 and a data sector 16. A portion of the disk 10 is referred to by the general reference number 18. Portion 18 overlaps the servo sector 12 and data sectors 14 and 16.

FIG. 2A shows a schematic of recordings of the sectors 12, 14 and 16 within the portion 18 of disk 10. Recordings on the disk portion 18 are divided into a plurality of servo tracks 20, 22, 24, 26, 28 and 30, and a plurality of data tracks 32, 34, 36, 38, 40 and 42. The servo tracks 20–30 are radially off-set from the data tracks 32–42 such that each data track lies half-way between two servo tracks. The disk 10 is encoded with information in the form of magnetic pulses which are represented by waveforms. To better illustrate such, FIG. 2B is a magnified portion 50 of pulses of the data sector 14. Each magnetic pulse has a width of one "T". "T" is a distance which corresponds to a distance the transducer head passes over the disk in eight hundred eighty-six nanoseconds when the disk rotates at six hundred rpm.

Within portion 18 are recordings of a speed buffer section 52 which overlaps data sector 14 and servo sector 12. The speed buffer section 52 recordings comprises numerous pulses. The speed buffer section 52 is located at the end of data sector 14. Thus, when the data sector 14 is written upon, the end of the written data will overlap into the speed buffer section 52. Due to slight variations in the rotation speed of the disk, the data recordings will not always exactly end at the end of the data sector 14. The speed buffer section 52 ensures that there will not be any gaps in the data sector 14 which could be confused with servo gaps.

The servo sector 12 begins in the speed buffer section 52. The servo sector 12 has a servo gap 54 which follows the speed buffer 52. The servo gap 54 does not contain any magnetic pulses so that when a transducer head reads the gap, the disk drive system detects the gap and thus knows that it has reached the servo sector 12 and must look for the synchronization (sync) and alternate synchronization (alternate sync) marks.

A synchronization section 56 follows the servo gap 54. The synchronization section 56 may or may not have a sync mark 58. Consecutive servo tracks alternate between having and not having sync marks 58 and as illustrated, servo tracks 20, 24 and 28 have sync marks 58 and servo tracks 22, 26 and 30, do not. The sync marks 58 are typical of all sync marks and comprise four magnetic pulses.

An alternate synchronization section 70 follows the synchronization section 56. If the servo track does not have a sync mark 58 in the synchronization section 56, then it will have an alternate sync mark 72 in the alternate synchronization section 70. The servo tracks 22, 26 and 30 are illustrated as having alternate sync marks 72. The alternate sync marks 72 are typical alternate sync marks comprised of two magnetic pulses.

In operation, a transducer head is positioned along a data track, such as track 32, between two servo tracks such as 20 and 22. The servo gap 54 is read by the head. The gap 54 is usually fourteen "T"s long. However, the servo gap 54 is thirty-seven "T"s long on one servo sector of the disk. This longer servo gap 54 identifies an index sector or starting point for data writing. After the head detects servo gap 54, the disk drive system looks for either a sync mark or an alternate sync mark. If it reads four pulses, then it knows that it has read a sync mark 58 and the timing windows can be generated using this point as a reference. If two pulses are detected, then the disk drive system knows that an alternate sync mark 72 has been detected and it generates timing windows from that point taking into account the distance between the sync marks 58 and alternate sync marks 72. If the head is off of the data track, e.g. track 32, a great amount, then only one of the servo sector tracks may be read. However, the timing windows can still be generated based on either a sync mark 58 or alternate sync mark 72 alone.

The timing signals generated by the data disk drive system allow the system to know when to look for the information contained in the remainder of the servo sector 12. A code beat section 78 follows the alternate synchronization section 70. The code beat section 78 is divided into a subsection 80 and a subsection 82. A code beat mark 84 is typical of all code beat marks and is comprised of two magnetic pulses. Code beat mark 84 is shown in a first position of subsection 80. Each code beat section contains one code beat mark. The code beat mark is located in one of two positions of the subsection 80 or one of two positions in the second subsection 82. As shown in FIG. 2A, the location of the code beat mark is shifted one position with each consecutive servo track. Thus, servo track 22 has a code beat mark 86 in the second position of subsection 80; servo track 24 has a code beat mark 88 in a first position of subsection 82; and servo track 86 has a code beat mark 90 in a second position of subsection 82.

In operation, the disk drive system uses the timing windows generated from the synchronization sections 56 and alternate synchronization section 70 to set up the section 80 and 82 of code beat sections 78. The head reads between two servo tracks, so two code beat marks are read during one pass through the code beat section 78. If two code beat marks are both detected in either the subsection 80 or subsection 82, then the disk drive system knows that the data track is an even numbered track. If one code beat mark is detected in the subsection 80 and one code beat mark is detected in the subsection 82, then the system knows that the data track is an odd numbered track.

An "A" servo burst section 100 follows the code beat section 78. A servo burst gap 102 follows the "A" servo burst section 100. A "B" servo burst section 104 follows the servo burst gap 102. Finally, a transition gap 106 follows the "B" servo burst section 104. The consecutive servo tracks alternate between having an "A" burst in section 100 and having a "B" burst in section 104. The servo bursts are comprised of multiple magnetic pulses.

In operation, the timing windows generated from the synchronization and alternate synchronization sections 56 and 70, are used to set up the timing windows for the sections 100 and 104. The head passes between two servo tracks and reads an "A" burst from one servo track and a "B" burst from the other servo track The disk drive system measures the intensity of each burst. If the "A" burst measures greater than the "B" burst, then the system moves the head closer to the "B" burst servo track. If the "B" burst is greater than the "A" burst, then the system moves the head closer to the "A" burst servo track. The system thus keeps the head on the data track midway between the servo tracks. After the head reads the servo bursts, the head passes a transition gap 106. The head can be switched from a read to a write mode during the gap 106. The head is then ready to begin writing on the data tracks and data sector 16.

FIG. 3 shows a block diagram of a data disk drive system of the present invention and is designated by the general reference number 200. A flexible magnetic disk 202 is rotated by a motor 204. A top transducer head, otherwise known as head one, 206, and a bottom transducer head, otherwise known as head zero, 207, are attached to a carriage 208 which is driven by a linear motor 210. As the disk 202 rotates, the heads 206 and 207 read the information on the disk 202. The output signals from heads 206 and 207 are sent through amplifier and filter 212. A controller 220 is connected to a central processing unit 222. The signals from amplifier and filter 212 are sent to a digitizer 226 and then to a servo decoder 228. The servo decoder 228 is connected to a demodulator, peak detect, sample/hold device 230 and controller 220. The servo decoder 228 detects the servo gap 54, the sync marks 58 of the synchronization section 56 and alternate sync marks 70 of alternate synchronization section 70, and generates the appropriate timing pulses or windows. The servo decoder 228 also provides timing pulses for alternately switching heads to read the servo sectors on both sides of the disk 202. Device 230 uses the timing pulses from decoder 228 to read the servo information, i.e., the "A" and "B" servo bursts of sections 100 and 104. The device 230 then calculates and sends a position error signal to a compensator 232 which in turn is connected to a linear motor 210. Compensator 232 controls linear motor 210 to move heads 206 and 207 to keep the heads on track.

FIG. 4 shows a side elevation view of the disk 10 of FIG. 1. The disk 10 has a top surface 300 and a bottom surface 302. Disk 10 has a plurality of servo sectors 304, 306, 308, 310, 312, 314, 316, 318, 320, 322 and 324, and a plurality of data sectors 330, 332, 334, 336, 338, 340, 342, 344, 346 and 348. Note that the top surface servo sectors 306, 310, 314, 318 and 322 are located half-way between the bottom surface servo sectors 304, 308, 312, 316, 320 and 324.

Once the system 200 has located the desired track on disk 10, the disk is rotated and the track is read or written upon. Heads 206 and 207 are positioned above the surface of disk 10 as the disk 10 rotates. In FIG. 4, head 206 is shown in a position in which it can either read or write on data sector 330. However, due to cross-talk, the head 207 cannot read the servo sector 304 on the bottom surface 302 when head 206 is writing.

The head 206 will then read servo sector 306. The system 10 then switches to the bottom head 207 and servo sector 308 is read. The system continues to switch heads to read servo sectors 310, 312 and 314. The system uses the position information from the servo sectors to adjust the position of the head which is reading or writing to keep it on track. In this case, head 206 is being used to write and is called the master head. After servo sector 314 is read, then head 206 continues to read or write on data sector 342. The system continues in this way to read or write on every third data sector on side 300 until the track is completely written or read. Because every third data sector is read or written upon, the entire process will take three revolutions of the disk. If the surface 302 is read or written upon, then head 207 is the master head and every third data sector on the bottom surface 302 is read or written upon and the heads switch to read the servo sectors in between. The system 10 is thus able to utilize both the servo sectors on the top and bottom surfaces to keep the master head on track. The servo sector on top and bottom are off-set so they do not duplicate one another. Twice the servo sector information is obtained without losing any data sector capacity.

FIG. 5 shows a block diagram of the servo decoder 228. The decoder 228 includes a gap detect circuit 300 and the servo signal from the digitizer 226 is passed to the gap detect circuit 300. The gap detect circuit 300 is connected to a sync detect circuit 302, a demodulator clock generator 306, and a controller signal generator 308. When the gap detect 300 detects the servo gap 54, it sends a timing pulse "T2" and a "sync gate" pulse to the gap detect circuit 300. The "T2" and "sync gate" signals set the timing windows for reading the sync and alternate sync sections 56 and 70. The sync detect 302 detects if the servo gap is an index sector, and if it is, the sync detect 302 sends an index signal to the controller signal generator 308. The servo signal is passed to the sync detect circuit 302. The demodulator clock generator 306 sends an end servo burst signal to the controller signal generator 308 when the end of the servo section is reached.

The sync detect circuit 302 detects the sync marks 58 or alternate sync marks 72 and sends a start signal to demodulator clock generator 306. The amount of time delay in sending the synchronization signal depends on whether a sync mark 58 or alternate sync mark 72 was detected.

The controller signal generator 308 generates signals for the controller 220. An index signal 322 signifies that the index sector is being read. A write enable signal 324 prevents the write mode from being used during the time the head is reading a servo sector.

The demodulator clock generator 306 generates timing signals for the demodulator, peak detector and sample/hold device 230. A "T0" signal 330 is the sample pulse for the present sampling period and provides timing for switching heads. A first order sample and hold signal 332 provides a reset signal for the first order integrator of device 230. An even track signal 334 indicates that an even track is being read and an odd track signal 336 indicates that an odd track is being read. A head switch logic circuit 350 is connected to the demodulator clock generator 306 and the controller signal generator 308. The head switch logic 350 provides timing signals for device 230. A burst gate 352 sets the timing window for reading the servo bursts "A" and "B". A head zero "A" sample signal 354 provides timing for reading the "A" sample with head zero. A head zero "B" sample signal 356 provides timing for reading the "B" sample with head zero. A head one "A" sample signal 358 provides timing for reading an "A" sample with head one. A head one "B" sample signal 360 provides timing for reading a "B" sample with head one. A "T-1" signal 362 provides timing for storage of the previous servo sector which was read.

Figure 6:
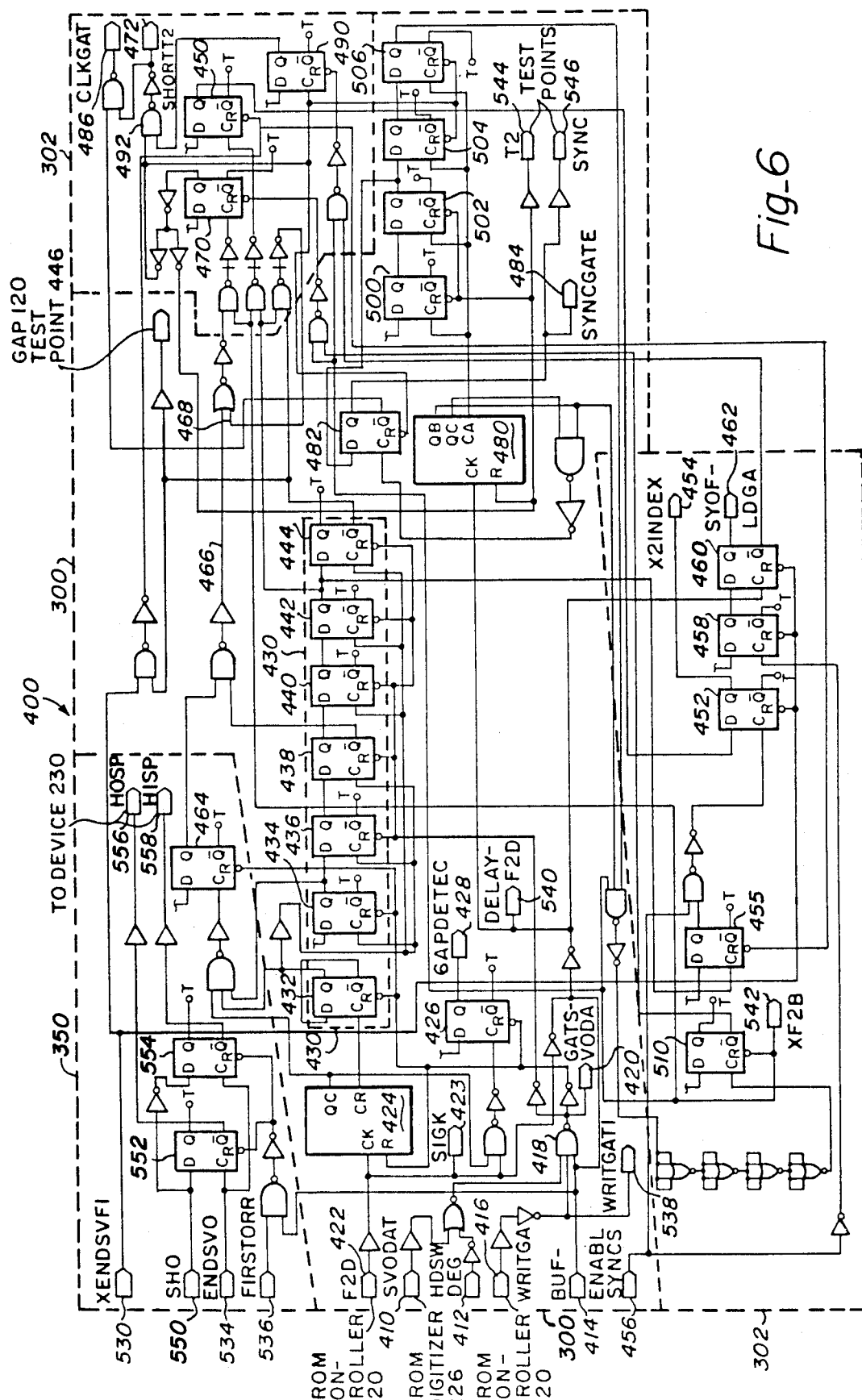
FIG. 6 is a circuit diagram of part of the servo decoder of FIG. 5.

FIG. 6 shows a circuit diagram of part of the servo decoder 228 and is designated by the general reference number 400. Part 400 contains parts of the gap detect 300, sync detect 302 and head switch logic 350. Gap detect 300 receives signals from the digitizer 226 at a point 410. The signals at point 410 are known as servo data signals (SVODAT). The SVODAT signals are gated with signals from a point 412. The signals at point 412 originate in circuits shown in FIG. 9. Point 412 is part of the switching logic 350. A point 414 receives a BUFFNABL signal from the controller 220, via FIG. 8, when the controller 220 wants to disable the decoder. A point 416 receives a write WRITGA signal from the controller 220 to disable the decoder 228 when the disk drive system 200 is writing on a data section. The SVODAT signal from point 410 is connected to a gate 418. Depending upon the WRITGA and BUFFNABL signals, the SVODAT signal passes gate 418 and reaches a point 420. The gated servo data (GATSVODA) signal at point 420 goes to FIG. 7 for use by the sync detect 302.

A point 422 receives a F2D signal from controller 220. The F2D signal is a constant 3.225 megahertz crystal frequency signal. The F2D signal is passed to a point 423 and is known as a SIGK signal. A decade counter 424 starts counting as soon as the SVODAT signal goes low, indicating the presence of a gap. When four clock or timing pulses from the crystal frequency F2D are counted, the counter 424 clocks a latch 426 and a gap detect (GAPDETEC) signal is sent to a point 428. The gap detect signals are used by the sync detect 302 in FIG. 7.

A shift register 430 is connected to counter 424 and is used to detect gaps in the servo data greater than four timing pulses. Shift register 430 is comprised of a plurality of latches 432, 434, 436, 438, 440, 442 and 444. Counter 424 counts ten timing pulses and then clocks latch 432. Latch 432 divides the signal from counter 424 by two. The output of latch 432 is used to clock the rest of the latches in the shift register 430. Each latch counts twenty timing pulses. Latch 434 counts twenty, latch 436 counts forty, latch 438 counts sixty, latch 440 counts eighty, latch 442 counts 100 and latch 444 counts one hundred twenty. As long as a gap is detected in the SVODAT signal, then the shift register 430 keeps shifting from latch to latch. A test point 446 receives a gap 120 signal after one hundred twenty timing pulses.

When shift register 430 reaches one hundred timing pulse counts, it indicates that an index sector is being read, and a latch 450 is then clocked. The output of latch 450 enables a latch 452 which in turn puts out an X2INDEX signal at a point 54 which is used by the circuits in FIG. 10. Latch 452 is clocked by a latch 455. When a sync or alternate sync signal is detected in sync detect 302, a SYNCS signal is provided at a point 456 from the portion of the sync detect 302 shown in FIG. 7. The SYNCS signal clocks a latch 458 which in turn enables a latch 460. Latch 460 provides a one clock delay before an SVOFLDGA signal is sent to a point 462. The SVOFLDGA signal is used to start the demodulator clock generator 306.

T2 is the window for detecting sync marks. Two different T2 windows are generated depending upon whether a regular sector or an index sector is being read. A latch 464 is clocked after a gap is detected and the first T2 signal is sent along a line 466. If an index gap is detected, a second T2 signal is sent from latch 444 along line 468. Both T2 signals are gated and clocked at latch 470. Latch 470 delivers a SHORTT2 signal to a point 472. The SHORTT2 signal is the actual T2 signal used by the sync detect 302.

The trailing edge of the T2 window is set by a decade counter 480. Decade counter 480 determines how long T2 is active. When T2 become active, counter 480 starts counting and at every sixth count clocks a latch 482. Latch 482 sends a SYNCGATE signal to a point 484. The SYNCGATE signal is used by the sync detector 302 in FIG. 7 to divide T2 into two windows for detecting the sync and alternate sync marks. Latch 482 sends an inverse signal to a point 486 called a clock gate (CLKGAT) which is also used by the sync detect 302 to ensure gating for the alternate sync mark.

A latch 490 is latched by latch 460 if a sync or alternate sync is detected. Latch 490 then sends a signal to a gate 492 which shuts off the SHORTT2 signal. A plurality of latches 500, 502, 504 and 506 form a sequential delay network for the T2 signal which is connected to counter 480. Counter 480 generates decade clocks to latch 500, 502, 504 and 506 at counts of 10, 20, 30 and 40, respectively. Latch 506 then clocks a latch 510. Latch 510 then resets latch 470.

Figure 7:
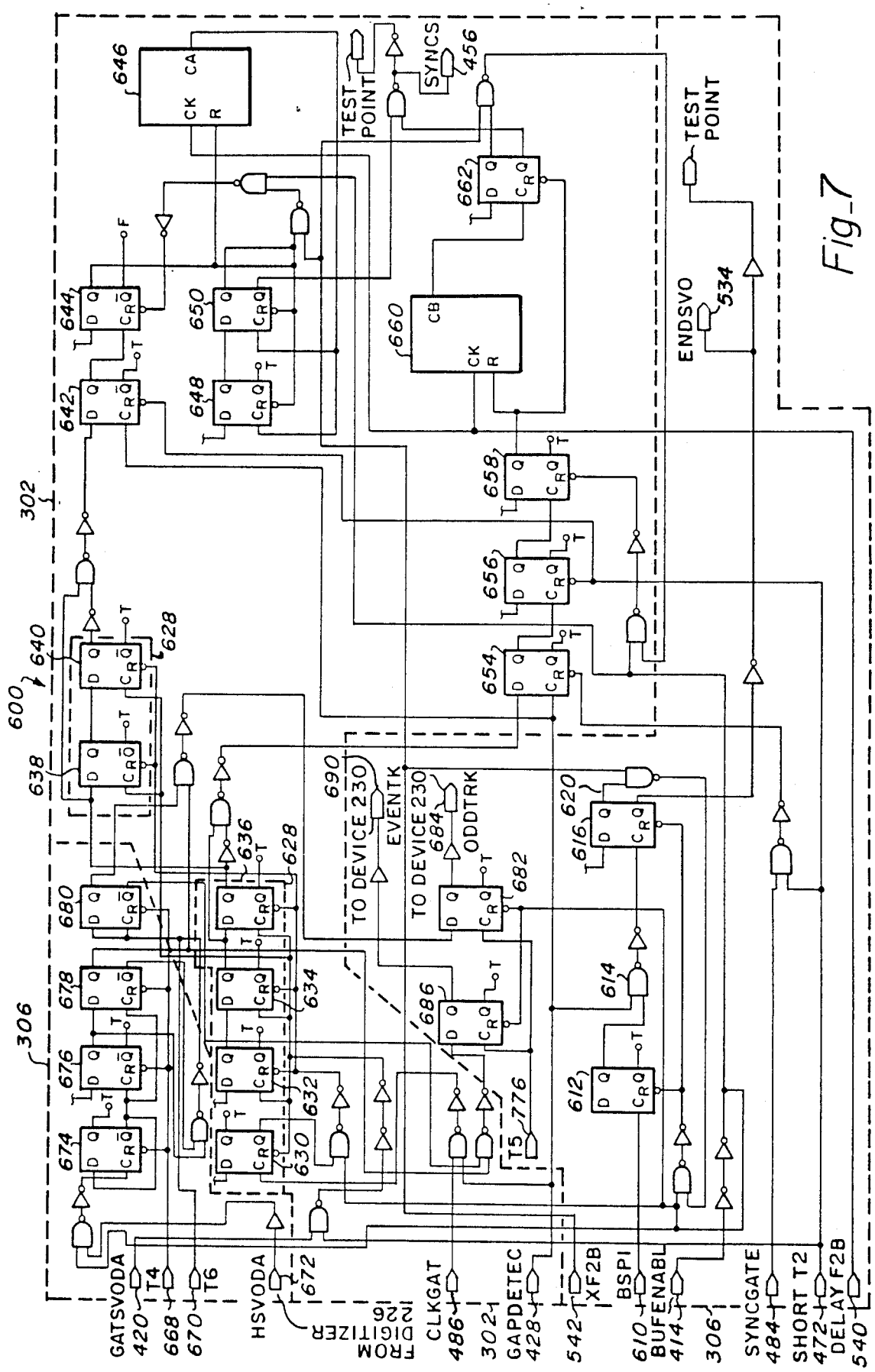
FIG. 7 is a circuit diagram of part of the servo decoder of FIG. 5.
Figure 8:
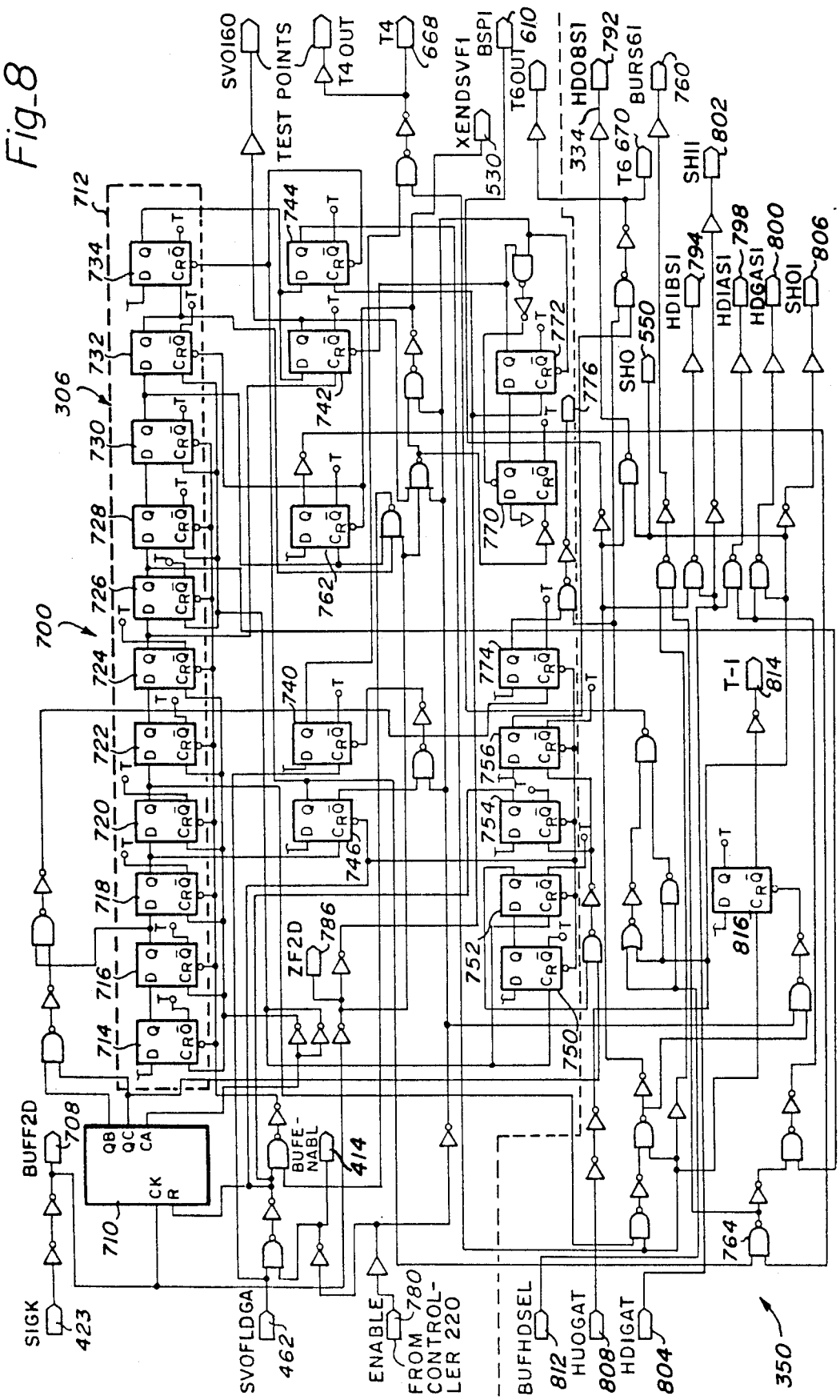
FIG. 8 is a circuit diagram of part of the servo decoder of FIG. 5.

A point 530 receives an end demodulation clock generator signal (XENDSVFI) from the demodulator clock generator 306 of FIG. 8. This signal resets the index latches 450, 452, 455, 458 and 460. A point 534 receives an end servo burst signal (ENDSVO) from the circuits of FIG. 7. A point 536 receives a first order signal (FIRSTORR) from the circuits of FIG. 9. The first order signal occurs 6.2 microseconds after the end servo burst. It is used to reset a first order sample and hold integrator circuit in the demodulator 230. A point 538 receives an inverted write gate signal (WRITGATI) from point 416 and is used in the circuits of FIG. 9. A point 540 receives a crystal frequency signal from point 422 and is known as a delayed F2D signal (DELAYF2D) which is used in the circuits of FIG. 7 as the master clock to generate all timing signals for the circuits. A point 542 receives an inverted crystal frequency signal from point 422 and is known as an XF2B signal and is used in the circuits of FIG. 7. A point 544 and a point 546 are used as test points.

A portion of the head switch logic 350 is shown in FIG. 6. A point 550 receives a SHO signal from the head switch logic 350 of FIG. 8. The SHO signal indicates which head is active at any time. The end servo burst signal from point 534 clocks a latch 552 and a latch 554 at the same time. If head zero is being used, SHO signal will enable latch 552 and an HOSP signal is sent to a point 556. If head one is being used, the SHO signal will enable latch 554 and an H1SP signal is sent to a point 558.

FIG. 7 shows a circuit diagram of part of the servo decoder 228 and is designated by the general reference number 600. Part 600 contains parts of the demodulator clock generator 306 and sync detect 302. A point 610 receives a BSP1 signal from the demodulator clock generator of FIG. 8. BSP1 is the "B" servo burst sample window. The trailing edge of the window clocks a latch 612. The output of latch 612 and the gap detect (GAPDETEC) signal from point 428 are gated at a gate 614 and the resulting signal clocks a latch 616. The output of latch 616 is then sent to a point 534. The signal at point 534 is the end servo burst (ENDSVO) which indicates that the end of a servo sector has been reached. Latch 616 has an output 620 which is gated with the XF2B signal from point 542 and the BUFF-NABL signal from point 414 and is then used to reset latch 616.

The slight delay in the reset of latch 616 causes the end servo burst at point 534 to be a short burst. The XF2B signal at point 542 is the inverted crystal frequency from FIG. 6 and the BUFFNABL signal at point 414 is the signal from the controller 220 which is used to disable the decoder 228.

A shift register 628 is comprised of a plurality of latches 630, 632, 634, 636, 638 and 640. The clock gate (CLKGAT) signal from point 486 and the gap detect (GAPDETEC) signal from point 428 are gated and provide the clocking for latch 630. Latch 630 detects any gaps between pulses and if a gap is detected, it clears the rest of register 628. Latch 630 is enabled only when the clock gate signal is on, which is when the alternate sync section 70 is being read.

Latch 632 detects one pulse from the gated servo data (GATSVODA) from point 420. Latch 634 detects two pulses, latch 636 detects three pulses, latch 638 detects four pulses and latch 640 detects five pulses. The latch 630 does not look for a gap during the sync section 56. This is because the sync detect will detect a sync mark even if only three of the four pulses of the sync mark are detected. If three or four pulses are detected, a signal is sent to enable a latch 642. If five pulses are detected, then latch 642 is not enabled.

Latch 642 is clocked by a gap detect (GAPDETEC) signal from point 428. If sync pulses of three or four are detected, then latch 642 is enabled and it clocks a latch 644 which enables a decade counter 646 and resets a latch 648 and a latch 650. The latches 648 and 650 count the carries out of decade counter 646. Decade counter 646 divides the crystal frequency from point 540 by ten so that latch 648 counts ten timing pulses and latch 650 counts twenty timing pulses. Latch 650 then sends a SYNCS signal to a point 456 of FIG. 6. Latch 650 also resets latch 644.

If two pulses are detected by shift register 628, then a signal is sent to enable a latch 654. Latch 654 is reset by a gated sync gate signal from point 484 and the SHORTT2 signal from point 472. Latch 654 is clocked by the gap detect signal from point 428. Latch 654 then clocks a latch 656 which in turn clocks a latch 658. Latch 658 enables a decade counter 660. Decade counter 660 clocks a latch 662. Latch 662 provides a two timing pulse delay and then sends a SYNCS signal to point 456. The twenty timing pulse delay of latch 650 and the two pulse delay of latch 662 ensure that the SYNCS signal resulting from detection of a sync mark arise at point 456 at approximately the same time as the SYNCS signal resulting from detection of an alternate sync mark.

A point 668 receives a T4 signal from the demodulator clock generator 306 of FIG. 8. T4 is the timing window for the code beat section 78. A point 670 receives a T6 signal from the demodulator clock generator 306 of FIG. 8. T6 is the timing window which indicates the beginning of the second section 82 of the code beat section 78. A point 672 receives an HSVODA signal from digitizer 226. HSVODA signal is the digitized signal from the transducer head.

Signal T4 resets a latch 674, a latch 676, a latch 678 and a latch 680. Latch 674 receives clocking from point 672. Latch 674 divides the signal by two. Latch 674 clocks latch 676 and latch 678. Latch 676 detects two pulses and latch 678 detects four pulses from the servo data being read.

A latch 680 is enabled if two pulses are detected after the T4 window begins, but before the T6 window begins. Latch 680 enables a latch 682. Latch 682 puts out an odd track signal to a point 684. The odd track signal indicates that two pulses have been detected in either subsection 80 or subsection 82 of the code beat section 78 and so the track is an odd numbered track. A latch 686 is enabled if four pulses have been detected by latch 678 and latch 680 is not outputting its signal. The latch 686 puts out an even track signal to a point 690. The even track signal indicates that zero and four pulses have been detected in either subsection 80 or subsection 82 of the code beat section 78 which indicates that this is an even numbered track.

FIG. 8 shows a circuit diagram of part of the servo decoder 228 and is designated by the general reference number 700. Part 700 contains parts of the demodulator clock generator 306 and head switch logic 350. The SIGK signal from point 423 of FIG. 6 is the crystal frequency and is passed to a point 708 and is known as a BUFF2D signal. The BUFF2B signal clocks a decade counter 710. A shift register 712 is comprised of a plurality of latches 714, 716, 718, 720, 722, 724, 726, 728, 730, 732 and 734. The shift register 712 is enabled after twenty-four timing counts of the crystal frequency.

A latch 740 is connected to point 462 from FIG. 6. The SVOFLDGA signal is used to start the demodulator clock generator 306 and indicates that the syncs or alternate syncs marks have been detected. The SVOFLDGA signal clocks latch 740 and the T4 signal is output at point 668. Once the shift register 712 is enabled, the latches begin to count. Latch 714 represents thirty timing pulses, latch 716, forty timing pulses, etc. Latch 732 represents one hundred twenty timing pulses. When latch 732 is enabled, it clocks latch 734. Latch 734 then enables a latch 742 and a latch 744. Latch 744 is clocked by the crystal frequency signal from point 423 and is active after one hundred twenty-one timing pulses. Latch 732 resets register 712 so it can run through a second cycle. On the second cycle, latch 742 is clocked after one hundred eighty timing pulses.

A latch 746 is clocked after fifty timing pulses of register 712. Latch 746 resets latch 740 and shuts off the T4 signal at point 668. A latch 750 is clocked by counter 712. Latch 750 enables a latch 752. Latch 752 clocks a latch 754. Latches 750 and 752 form a twenty-four timing pulse delay circuit. Latch 754 enables the shift register 712 after the twenty-four timing pulse delay. A latch 756 is enabled by latch 752. Latch 756 outputs a T6 signal to point 670.

Latch 746 is clocked after fifty timing pulses. The output forms the leading edge of the burst gate window (BURSGI) and is sent to a point 760. A latch 762 is clocked by shift register 712 at one hundred ten timing pulses. The inverted output of latch 762 is sent to an AND gate 764 and shuts off the burst gate signal at point 760. When latch 744 is enabled after one hundred twenty timing pulses, a signal is sent to point 760. This signal represents the leading edge of the second window of the burst gate. After one hundred eighty counts, latch 742 outputs an XENDSVFI signal to point 530. The XENDSVFI signal indicates the end of the servo sector and resets the servo decoder circuits. It also causes an end to the second window of the servo burst gate.

A latch 770 and a latch 772 are connected to latch 742. Latch 770 and 772 form a delay circuit to ensure that the XENDSVFI signal is long enough. A latch 774 is clocked by shift register 712 after forty timing pulses. Latch 774 sends a T5 signal to a point 776. Signal T5 is used by the circuits of FIG. 7. A point 780 receives an ENABLE signal from controller 220 The ENABLE signal enables the decoder 228. A point 786 receives a ZF2D signal from point 423.

Point 610 receives a BSP1 signal which represents the sample window for the "B" servo pulse. The latch 720 outputs the leading edge of the window. The trailing edge of the "B" servo sample window is controlled by the XENDSVFI signal shown at point 530. A point 792 receives an HDOBS1 signal which is the "B" sample window for head zero. A point 794 receives a HD1BS1 signal which is the "B" sample window for head one.

A point 798 receives a HD1AS1 signal which represents the "A" sample pulse window for head zero. A point 800 receives a HD0AS1 signal which represents the "A" sample window of head one. The leading edge of both the HD1AS1 or HD0AS1 are clocked by latch 746. The trailing edge of both are clocked by latch 762.

A point 802 receives an SH11 signal from a point 804. Point 804 receives a HD1GAT signal from FIG. 9. A point 806 receives an SH01 signal from a point 808. Point 808 receives a HD0GAT signal from FIG. 9. A point 810 receives an SH0 signal from point 808. A point 812 receives a BUFHDSEL signal from FIG. 9.

A point 814 receives a T-1 signal. The leading edge is provided by a latch 816. Latch 816 is clocked by latch 744. The latch 816 is reset and sets the trailing edge of the T-1 signal when latch 720 is enabled.

FIG. 9 comprised of sheets FIG. 9A and 9B, shows a circuit diagram of part of the servo decoder 228 and is designated by the general reference number 900. Part 900 also shows parts of the controller signal generator 308 and head switch logic 350. An end servo burst signal (ENDSVO) from point 534 clocks a latch 910. Latch 910 enables a decade counter 920. Decade counter 920 clocks a latch 922. Latch 922 clocks a latch 924. Latch 924 clocks a latch 926. Latch 926 sends a signal to point 536 and a point 930. Point 536 receives a FIRSTORR signal, which is a signal generated after the end servo burst signal which is used by the circuits of FIG. 6. Point 930 receives a first order (FIRSTO) signal which is used by device 230 to reset itself. Latch 926 clocks latch 932. Latch 932 resets latch 910.

Latch 924 clocks a latch 936. Latch 936 enables a counter 938, 940 and 942. Latch 936 also resets a latch 944, a latch 946 and a latch 948. Latch 936 outputs an INHWRG signal to a point 950. The INHWRG signal goes to controller 220 and indicates that the head is passing the servo sector and that the data cannot be written upon. When INHWRG is clear, then counter 938, 940 and 942 count a time equivalent to the time required for the data sector to end and the next servo sector to begin. Counter 942 then resets latch 952. Latch 952 then resets latch 936 and the INHWRG signal is on. A latch 956 and a latch 958 provides speed testing of counters 938, 940 and 942.

A point 960 receives an HDSEL0 signal from controller 220. The HDSEL0 signal indicates if head one or zero is going to be used to read or write. The HDSEL0 signal is used to set a flip-flop 962 to produce a HDOGAT signal at point 808. The HDOGAT signal indicates that the system 10 is reading or writing on head zero. The end servo burst (ENDSVO) from point 534 clocks flip-flop 962 and an HD1GAT signal is sent to point 804. So, no matter which head is used first, the flip-flop 962 will automatically switch to the other head at the end of the servo sector.

The end servo burst (ENDSVO) from point 534 also clocks a latch 963. The output of latch 963 is gated with the output from a latch 964. Latch 964 functions as a divide-by-two counter. A series of counters 965, 966 and 967 form a timing circuit. Counter 967 times out 1.5 milliseconds after the end servo burst. If there is a bad servo sector, the system decoder 228 would stay on the same head and would miss a good sector on the other head before reading the next good sector on the same head. To prevent this, the counter counts 1.5 milliseconds after the end servo bursts. If another end servo burst is received in that time, it knows that a sector has been missed and a signal is sent along a line 968 to flip-flop 962 to switch heads to look for the next good servo sector on the other side. If an end servo burst signal is received within 1.5 milliseconds, then the counters 965-967 are loaded and prevented from timing out.

A latch 970 is enabled when counter 967 times out. Latch 970 resets latch 963. A latch 972, 974 and 976 form a gate array testing network. The gate array is used to test the speed of the counters 962, 964 and 966.

A point 978 receives an HDSEL01 signal. The HDSEL01 signal is the inverse HDSEL0 signal and is used in FIG. 10. The BUFENABL signal at point 414 comes from the controller 220 via FIG. 8 and is used to disable the decoder 228. The write gate one (WRITGAT1) signal at point 538 is used to disable the head switching feature when the head is writing a sector. The WRITGAT1 signal comes from controller 220 via FIG. 6. A point 980 receives an SVOHDS signal. The SVOHDS signal is used as a test input to determine which of the heads is active.

A point 982 receives a WRITGATR signal from FIG. 10. The WRITGATR signal is a small pulse signal after the WRITGAT1 signal is finished which starts a head switch delay. The WRITGATR signal causes an HDSWDEG signal to be sent to point 412. The HDSWDEG signal prevents the decoder from reading servo information for twenty microseconds after a write cycle. This delay is needed due to signal loss during switching from read to write modes. A counter 984 and 986 count a twenty microsecond delay and stop a HDSWDEG signal from reaching point 412.

The HDSEL0 signal from point 960 is gated with the HD0GAT signal from point 808 and the HD1GAT signal from point 804 to clock latch 952. Latch 952 controls the INHWRG signal so that it is only enabled for the side of the disk upon which writing is being done.

FIG. 10 shows a circuit diagram of part of the servo decoder 228 and is designated by the general reference number 1000. FIG. 10 primarily concerns the head switching logic 350. However, a small part deals with the detection of the index sector. When an index sector is detected, the X2INDEX signal is generated in the circuits of FIG. 6. The X2INDEX signal sets a latch 1010. An AT01 signal at a point 1011 from FIG. 9 provides clocking for latch 1010. Latch 1010 outputs an INDEX signal at a point 1012. The INDEX signal goes to controller 220.

A sector signal is sent to controller 220 from a point 1014. The sector signal is needed to provide synchronization for writing on a sector. The FIRSTORR signal from point 536 sets a flip-flop 1016. Flip-flop 1016 is clocked by AT01 signal from point 1011. The output of flip-flop 1016 enables a latch 1018. The BUF2F2D signal from point 828 clocks latch 1018. The output of latch 1018 is sent to point 1014 to provide the sector signal.

A BUFNDSEL signal arrives at a point 812 from FIG. 9. The HD0GAT, BUFNDSEL, HDSEL01 signals are gated so that the index and sector signals are output only when the head which is reading or writing is active. The BUFF2D signal at point 708 clocks a latch 1022 and a latch 1024. WRITGAT1 signal from point 538 enables latch 1022 which in turn enables latch 1024 and a WRITGATR signal is output at point 982 for use in FIG. 9.

FIG. 11 is the circuit diagram of the decade counter 424 of FIG. 6, FIG. 12 is the circuit diagram of the decade counter 480 of FIG. 6, FIG. 13 is the circuit diagram of the decade counter 660 of FIG. 7, FIG. 14 is the circuit diagram of counter 710 of FIG. 8, and FIG. 15 is the circuit diagram of decade counter 646 of FIG. 7 and counter 920 of FIG. 9. The components of FIGS. 11–15 are illustrated by their common recognized figures.

FIG. 16 shows the amplifier and filter 212, digitizer 226, and a portion of the demodulator, peak detect, sample/hold device 230. The amplifier and filter 212 is comprised of a plurality of capacitors 1110, 1112, 1114 and 1116, a plurality of resistors 1118, 1120, 1122, 1124 and 1125, a switch 1126, a switch 1128 and a transistor 1130. Signals from head zero are received at a point 1132 and signals from head one are received at a point 1136. Point 806 receives the SH01 signal from the decoder 228 which closes switch 1126 when head zero is active. Point 802 receives the SH11 signal from the decoder 228 which closes switch 1128 when head one is active.

The digitizer 226 is comprised of a plurality of resistors 1140, 1142, 1144, 1146, 1148 and 1150, a voltage comparator 1152, a comparator 1154 and a NAND gate 1156. The signal from the amplifier and filter 212 is digitized and sent to the decoder via point 672.

The device 230 has a peak detect circuit 1160. The peak detect circuit 1160 is comprised of a plurality of resistors 1162, 1164, 1166, 1168, 1170, 1172, 1174 and 1176, a plurality of diodes 1178, 1180, 1182, 1184 and 1186, a capacitor 1188, a buffer gate 1190, an inverter 1192, a transistor 1194, a transistor 1196 and a plurality of switches 1198, 1200, 1202 and 1204. Point 760 receives the servo burst gate signal from the decoder 228 which sets the windows for reading the servo burst signals. The servo burst signals are received from the amplifier and filter 212. Point 800 receives an HD0AS1 signal which sets the window for the head zero "A" servo burst sample. The HD0AS1 signal closes switch 1198 and the "A" sample from head zero is sent to a head zero "A" sample hold circuit 1206. The HD0AS1 signal from point 792 closes switch 1200 and sends the head zero "B" sample to a head zero "B" sample hold circuit 1208. The HD1AS1 signal from point 798 closes switch 1202 and sends the head one "A" sample to a head one "A" sample hold circuit 1210. The HD1AS1 signal from point 794 closes switch 1204 and sends a head one "B" sample to a head one "B" sample hold circuit 1212.

Hold circuit 1206 is comprised of a resistor 1214, a resistor 1216, a capacitor 1218 and an amplifier 1220. Hold circuit 1208 is comprised of a resistor 1222, a resistor 1224, a capacitor 1226, and an amplifier 1228. Hold circuit 1210 is comprised of a resistor 1230, a resistor 1232, a capacitor 1234 and an amplifier 1236. Hold circuit 1212 is comprised of a resistor 1238, a resistor 1240, a capacitor 1242 and an amplifier 1244.

A head zero difference circuit 1246 is comprised of a plurality of resistors 1248, 1250, 1252 and 1254 and an amplifier 1256. Circuit 1246 receives the head zero "A" servo burst signal from circuit 1206 and the head zero "B" servo burst signal from circuit 1208 and outputs a different signal to a point 1258. Point 1258 goes to a correction circuit 1259 shown on FIG. 17 which modifies the signal to correct for misalignment between heads one and zero. The resulting signal is returned to a point 1260.

A head one difference circuit 1262 is comprised of a plurality of resistors 1264, 1266, 1268 and 1270, and an amplifier 1272. Circuit 1262 receives the head one "A" servo burst signal from circuit 1210 and the head one "B" servo burst signal from circuit 1212 and outputs a different signal to a point 1274. The signal at point 1274 goes to the correction circuit 1259 and is modified and returned to a point 1276.

A difference circuit 1278 receives the signal from points 1260 and 1276 and outputs a difference signal to a point 1280. This difference signal is used by the correction circuit 1259. The difference circuit 1278 is comprised of a plurality of resistors 1282, 1284, 1286 and 1288, a capacitor 1290, a capacitor 1292 and an amplifier 1294.

An A and B difference hold circuit 1296 alternately holds either the difference signal from point 1260 or point 1276. A switch 1298 is controlled by the inverse H0SP signal from point 556. If the servo data from head zero has been read, then the switch 1298 will close and circuit 1296 will hold the signal from point 1260. A switch 1300 is controlled by the inverse H1SP signal from point 558. If the servo data from head one has been read, then switch 1300 will close and circuit 1296 will hold the signal from point 1276. Circuit 1296 is further comprised of a resistor 1302, a resistor 1304, a capacitor 1306 and an amplifier 1308.

A "T0" hold circuit 1310 receives the signal from the A and B difference hold circuit 1296. A switch 1312 is controlled by the "T0" signal from point 931. Switch 1312 is closed and the circuit 1310 receives and holds the difference signal from the last servo reading. Circuit 1310 is further comprised of a resistor 1314, a resistor 1316, a capacitor 1318 and an amplifier 1320.

A T-1 hold circuit 1322 receives the signal from the A and B difference hold circuit 1296. A switch 1324 is controlled by the T-1 signal from point 814. Switch 1312 is closed and the circuit 1322 receives and holds the difference signal from the servo sector which was read two servo sectors ago. The circuit 1310 holds the difference signal from the last servo sector which was read and circuit 1322 holds the difference signal from the reading before that. Thus, the difference signal from two previous servo sector readings are held at the same time. Circuit 1322 is further comprised of a resistor 1326, a resistor 1328, a capacitor 1330, and an amplifier 1332.

A difference circuit 1334 is comprised of a plurality of resistors 1336, 1338, 1340, 1342 and an amplifier 1344. Difference circuit 1344 finds the difference in the servo readings for the last two servo sectors.

An integrator circuit 1346 is comprised of a resistor 1348, a resistor 1350, a capacitor 1352, an amplifier 1354, and a switch 1356. Integrator circuit 1346 integrates the signal from circuit 1334. The FIRSTO signal from point 930 closes switch 1356 and resets the integrator 1336 between samples.

An adder circuit 1358 is comprised of a plurality of resistors 1360, 1362, 1364 and 1366, and an amplifier 1368. Adder circuit 1358 adds the integrated signal from circuit 1346 to the difference signal from circuit 1296. In operation, the present invention uses the position information from the previous two servo sectors which were read to estimate the position for the next servo sector. The integrated difference signal from the previous two servo readings is added to the position information from the last servo reading to produce a position error signal at point 1370. This signal goes to the compensator 232.

FIG. 17 shows a circuit diagram of the correction circuit 1259. Circuit 1259 is comprised of a plurality of resistors 1372, 1374, 1376, 1378, 1380, 1382, 1384, 1386 and 1388, an inverter 1390, a switch 1392, a switch 1394, an amplifier 1396 and an amplifier 1398. Circuit 1259 is used to compensate for misalignment between heads zero and one. When the controller decides which head to read on by the HDSEL0 signal from point 450, that head becomes the master head and the other head is the slave head. The slave head is used merely to read servo sectors on that side to keep the master head on track. Due to misalignment between the two heads, the slave head will not be directly on track when the master head is on track. The object is to keep the head which is used for reading, the master head, on track. When the slave head reads a servo burst, part of the difference between the "A" and "B" bursts will be attributable to the head misalignment. Circuit 1259 effectively subtracts this head misalignment difference from the servo data read by the slave head, so that only servo data representing the distance the master head is off track will be used.

Circuit 1259 accomplishes this by subtracting the signal from point 1280 from the servo information read by the slave head. The signal at point 1280 represents the constant difference between the servo bursts of the two heads which represent the misalignment between the two heads. If head zero is the master head, then switch 1392 is open, and the signal from point 1258 passes unaltered to point 1260. Head one would be the slave head and switch 1394 would be closed. The signal from point 1280 would be subtracted from the signal at point 1274 and the difference output at point 1276. If head one were the master head, then the procedure would be reversed.

Thus, the DC component of the position signal of the master head and only the varying component (AC part) of the slave head position signal is used to essentially double the sampling rate of the position information.

FIG. 18 shows a timing diagram for the timing pulses of this invention. The timing pulses are shown in relationship to the sections of the servo sector.

Although the present invention has been described in terms of the presently preferred embodiment, it is to be understood that such disclosure is not to be interpreted as limiting. Various alterations and modifications will no doubt become apparent to those skilled in the at after having read the above disclosure. Accordingly, it is intended that the appended claims be interpreted as covering all alterations and modifications as fall within the true spirit and scope of the invention.

I claim:

1. A servo system for a disk drive system comprising:
a magnetic disk having data sectors and servo sectors alternating on a first and a second side of the disk, said data sectors and servo sectors each having a plurality of data tracks and servo tracks, respectively, said servo sectors of said first side are angularly offset from said servo sectors of said second side with said servo sectors of said first side located between said servo sectors of said second side;
a pair of transducer heads for reading said first and second sides of the disk;
a servo decoder means connected to the transducer heads for generating timing signals for reading said servo sectors and for providing timing for switching between the heads with the servo sectors on either side of the disk being alternately read as the disk rotates;
a peak detector means connected to the servo decoder means for detecting servo information peaks in said servo sectors;
a pair of first head hold means connected to the peak detector means for storing an A and B servo burst signal read from a servo sector from the first side of the disk.
a pair of second head hold means connected to the peak detector means for storing an A and B servo burst signal read from a servo sector of a second side of the disk;
a first difference means connected to the pair of first head hold means for outputting a first difference signal representing the difference between the A and B servo burst signals stored in the pair of first head hold means;
a second difference means connected to the pair of second head hold means for outputting a second difference signal representing the difference between said A and B servo burst signals of the pair of second head hold means;
a correction means connected to the first and second difference means to modify said first and second difference signals to compensate for misalignment of the heads;
a hold means connected to the correction means for alternately storing a difference signal from the first and second difference means;
a time zero hold means connected to the hold means for storing a difference signal from the hold means which represents servo information from the last servo sector which was read;
a time minus one hold means connected to the hold means for storing a difference signal from the hold means which represents servo information from the servo sector which was read previous to the last servo sector;

a third difference means connected to the time zero and the time minus one hold means for taking the difference between said storage signals, and outputting a first order difference signal;

an integrator means connected to the third difference means for integrating said first order difference signal; and an adder means connected to the integrator means to add said integrated first order difference signal to the difference signal in the hold means to produce a position error signal.

2. A method of reading servo information for a magnetic disk drive system comprising the steps of:

providing servo and data sectors on a first side of a magnetic disk;

providing servo and data sectors on a second side of a magnetic disk with said servo sectors of said second side being angularly offset and located between said servo sectors of said first side;

providing servo tracks and data tracks in said servo and data sectors, respectively;

alternating between a first and second transducer head to read the servo sectors of a track of said first and second side as the disk rotates by detecting the end of said servo sectors and switching between said first and second transducer heads responsive thereto;

inhibiting said switching between said first and second transducer head when said first head is located on every third data sector; and causing said first head to read or write in every third data sector.

3. A method of reading servo information for a magnetic disk drive system comprising the steps of:

providing servo and data sectors on a first side of a magnetic disk;

providing servo and data sectors on a second side of a magnetic disk with said servo sector of said second side being angularly offset and located between said servo sectors of said first side;

providing servo tracks and data tracks in said servo and data sectors, respectively;

alternating between a first and second transducer head to read the servo sectors of a track of said first and second side as the disk rotates by detecting the end of said servo sectors and switching between said first and second transducer heads responsive thereto;

producing a difference signal responsive to a pair of position signals read from the previous two servo sectors which were read;

integrating said difference signal and adding the most recent of said pair of position signals to produce a position error signal; and using said position error signal to position said first transducer head.

4. A method of reading servo information for a magnetic disk drive system comprising the steps of:

providing servo and data sectors on a first side of a magnetic disk;

providing servo and data sectors on a second side of a magnetic disk with said servo sector of said second side being angularly offset and located between said servo sectors of said first side;

providing servo tracks and data tracks in said servo and data sectors, respectively;

alternating between a first and second transducer head to read the servo sectors of a track of said first and second side as the disk rotates by detecting the end of said servo sectors and switching between said first and second transducer heads responsive thereto;

reading a first position signal from a servo sector of said first side of said disk and reading a second position signal from a servo sector of a second side of said disk;

producing a difference signal from said first position signal and said second position signal;

producing a corrected position signal by subtracting said difference signal from said second position signal; and using said corrected position signal to position said first transducer head on a data track.

5. A servo system for a disk drive system comprising:

a magnetic disk having data sectors and servo sectors alternating on a first and a second side of the disk, said data sectors and servo sectors each having a plurality of data tracks and servo tracks, respectively, said servo sectors of said first side are angularly offset from said servo sectors of said second side such that said servo sectors of said first side are located between said servo sectors of said second side;

a pair of transducer heads for reading said first and second sides of the disk;

a servo decoder means connected to said pair of transducer heads for detecting said servo sectors and for providing timing signals for switching between said transducer heads responsive thereto, such that the servo sectors on either side of the disk are alternately read as the disk rotates;

a position signal means connected to the transducer heads and the servo decoder means for reading servo information contained in said servo sectors and producing a position signal responsive to said servo information, such that said position signal is use to position one of the transducer heads on one of said data tracks; and said position signal means comprises an extrapolation means for estimating the position of a transducer head based on the extrapolation of a plurality of previously read servo information and producing said position signal responsive thereto.

* * * * *